US009124795B2

(12) United States Patent  
Coyle-Gilchrist

(10) Patent No.: US 9,124,795 B2
(45) Date of Patent: Sep. 1, 2015

(54) METHOD AND APPARATUS FOR OBTAINING AN IMAGE ASSOCIATED WITH A LOCATION OF A MOBILE TERMINAL

(71) Applicant: Nokia Technologies Oy, Espoo (FI)

(72) Inventor: Matthew John Toby Coyle-Gilchrist, Shelfanger (GB)

(73) Assignee: Nokia Technologies Oy, Espoo (FI)

( * ) Notice: Subject to any disclaimer, the term of this patent is extended or adjusted under 35 U.S.C. 154(b) by 80 days.

(21) Appl. No.: 13/661,972

(22) Filed: Oct. 26, 2012

(65) Prior Publication Data

US 2014/0122640 A1    May 1, 2014

(51) Int. Cl.
*G06F 15/16* (2006.01)
*H04N 5/232* (2006.01)
*H04L 29/08* (2006.01)

(52) U.S. Cl.
CPC ............ *H04N 5/232* (2013.01); *H04L 67/18* (2013.01)

(58) Field of Classification Search
CPC .......... H04N 2101/00; H04N 5/23251; H04N 5/23258; H04N 5/23293; H04N 7/185; H04N 1/00198; H04N 5/232; H04L 67/18
See application file for complete search history.

(56) References Cited

U.S. PATENT DOCUMENTS

| | | | |
|---|---|---|---|
| 6,547,456 B2 * | 4/2003 | Wechsler et al. | 396/422 |
| 6,690,883 B2 * | 2/2004 | Pelletier | 396/321 |
| 6,914,626 B2 * | 7/2005 | Squibbs | 348/231.3 |
| 7,007,243 B2 * | 2/2006 | Baldino | 715/853 |
| 7,088,389 B2 * | 8/2006 | Shibasaki et al. | 348/239 |
| 7,519,470 B2 * | 4/2009 | Brasche et al. | 701/457 |
| 8,131,118 B1 * | 3/2012 | Jing et al. | 382/305 |
| 2001/0046330 A1 * | 11/2001 | Shaffer et al. | 382/284 |
| 2002/0044690 A1 * | 4/2002 | Burgess | 382/209 |
| 2002/0075397 A1 * | 6/2002 | Hanada et al. | 348/372 |
| 2003/0020816 A1 * | 1/2003 | Hunter et al. | 348/231.3 |
| 2004/0004663 A1 * | 1/2004 | Kahn et al. | 348/207.1 |
| 2004/0183918 A1 * | 9/2004 | Squilla et al. | 348/211.2 |
| 2008/0064438 A1 * | 3/2008 | Calvet et al. | 455/556.1 |
| 2008/0133526 A1 * | 6/2008 | Haitani et al. | 707/7 |
| 2009/0196510 A1 * | 8/2009 | Gokturk et al. | 382/224 |
| 2011/0065451 A1 * | 3/2011 | Danado et al. | 455/456.1 |

(Continued)

FOREIGN PATENT DOCUMENTS

| | | |
|---|---|---|
| EP | 1 460 586 A2 | 9/2004 |
| WO | WO 2009/155071 A2 | 12/2009 |

OTHER PUBLICATIONS

International Search Report and Written Opinion for Application No. PCT/FI2013/050920 dated Mar. 7, 2014.

*Primary Examiner* — Sargon Nano
(74) *Attorney, Agent, or Firm* — Alston & Bird LLP

(57) ABSTRACT

A method, apparatus and computer program product are provided in order to obtain an image from a remote computer with the image being associated with the current location of a mobile terminal via which a user provides input soliciting the image. In the context of a method, the user input representative of a request to obtain an image from a remote computer may be received. The method may then determine a current context including a location of a mobile terminal and may cause the current context to be transmitted to the remote computer. The method may also receive an image from the remote computer based upon the current context of the mobile terminal. In this regard, the image is associated with the location of the mobile terminal upon receiving the user input. The method may also cause the image received from the remote computer to be stored.

21 Claims, 4 Drawing Sheets

(56) References Cited

U.S. PATENT DOCUMENTS

| | | |
|---|---|---|
| 2011/0184953 A1 | 7/2011 | Joshi et al. |
| 2011/0314084 A1* | 12/2011 | Saretto et al. ................ 709/203 |
| 2012/0011559 A1* | 1/2012 | Miettinen et al. ................ 726/1 |
| 2012/0209907 A1* | 8/2012 | Andrews et al. ............... 709/204 |
| 2013/0212094 A1* | 8/2013 | Naguib et al. ................ 707/730 |
| 2013/0232552 A1* | 9/2013 | Brush et al. ....................... 726/4 |
| 2013/0262483 A1* | 10/2013 | Blom et al. ................... 707/752 |

* cited by examiner

METHOD AND APPARATUS FOR OBTAINING AN IMAGE ASSOCIATED WITH A LOCATION OF A MOBILE TERMINAL

TECHNOLOGICAL FIELD

An example embodiment of the present invention relates generally to obtaining an image from a remote computer and, more particularly, to obtaining an image from a remote computer based upon the current context including the location of a mobile terminal.

BACKGROUND

Advances in technology have allowed for increasingly complex features to be integrated into mobile terminals. Convergence of technology has resulted in smart phones and cellular phones that have image and video capture capabilities, and image and video capture devices that are capable of wireless communications. As devices that can capture images and videos become ubiquitous and the population of users with access to these devices increases, users frequently want to capture images for a wide variety of purposes. For example, some users may take photographs as mementos, to remind themselves of a special occasion, a particular event, a vacation, or the like. However, capturing an aesthetically pleasing image can be difficult, particularly for users who only casually take photographs. In this regard, there are many variables, such as the lighting, the weather, the viewing angle, etc., that may complicate the image capture process and cause users to settle for a sub-optimal image.

BRIEF SUMMARY

In one embodiment, a method is provided that includes receiving user input representative of a request to obtain an image from a remote computer. The method of this embodiment also includes determining, using a processor, a current context including a location of a mobile terminal and causing the current context to be transmitted to the remote computer. The method of this embodiment also includes receiving an image from the remote computer based upon the current context of the mobile terminal. The image may be associated with the location of the mobile terminal upon receiving the user input. The method of this embodiment also includes causing the image received from the remote computer to be stored.

The method of an example embodiment may determine the current context by determining contextual information sensed by the mobile terminal. The contextual information of one embodiment may also include at least one of a time of day, a viewing angle, a weather environment, light conditions or a season. The method of an example embodiment may also include causing an image to be captured and causing the image that was captured to be stored along with the image received from the remote computer. In this embodiment, the image that was captured may be provided to the remote computer.

The method of an example embodiment may also include assigning a time value to the image received from the remote computer based upon a time at which the user input was received. In an example embodiment, the method may also include causing a user interface element to be displayed, determining whether an image associated with the location of the mobile terminal is available from the remote computer and causing a representation of the user interface element to be altered based upon availability of the image associated with the location of the mobile terminal from the remote computer. In this embodiment, the user interface element may be configured to receive the user input representative of the request to obtain an image from the remote computer. The method of an example embodiment may also include receiving user input partially overriding the current context. In this embodiment, the method may receive an image from the remote computer based upon the current context by receiving the image from the remote computer based upon the current context as partially overridden by the user input.

In another embodiment, an apparatus is provided that includes at least one processor and at least one memory including computer program instructions with the at least one memory and the computer program instructions configured to, with the at least one processor, cause the apparatus at least to receive user input representative of a request to obtain an image from a remote computer. The apparatus of this embodiment is also configured to determine a current context including a location of a mobile terminal and cause the current context to be transmitted to the remote computer. The apparatus of this embodiment is also configured to receive an image from the remote computer based upon the current context of the mobile terminal. The image may be associated with the location of the mobile terminal upon receiving the user input. The apparatus of this embodiment is also configured to cause the image received from the remote computer to be stored.

The at least one memory and the computer program instructions may also be configured to, with the at least one processor, cause the apparatus of an example embodiment to determine the current context by determining contextual information sensed by the mobile terminal. The contextual information of one embodiment may also include at least one of a time of day, a viewing angle, a weather environment, light conditions or a season. The at least one memory and the computer program instructions may also be configured to, with the at least one processor, cause the apparatus of an example embodiment to cause an image to be captured and to cause the image that was captured to be stored along with the image received from the remote computer. In this embodiment, the image that was captured may be provided to the remote computer.

The at least one memory and the computer program instructions may be configured to, with the at least one processor, cause the apparatus of an example embodiment to assign a time value to the image received from the remote computer based upon a time at which the user input was received. In an example embodiment, the at least one memory and the computer program instructions may be configured to, with the at least one processor, cause the apparatus to cause a user interface element to be displayed, determine whether an image associated with the location of the mobile terminal is available from the remote computer and cause a representation of the user interface element to be altered based upon availability of the image associated with the location of the mobile terminal from the remote computer. In this embodiment, the user interface element may be configured to receive the user input representative of the request to obtain an image from the remote computer. The at least one memory and the computer program instructions may also be configured to, with the at least one processor, cause the apparatus to receive user input partially overriding the current context. In this embodiment, the at least one memory and the computer program instructions may be configured to, with the at least one processor, cause the apparatus to receive an image from the remote computer based upon the current context by receiving the image from the remote computer based upon the current context as partially overridden by the user input.

In a further embodiment, a computer program product is provided that includes at least one non-transitory computer-readable storage medium bearing computer program instructions embodied therein for use with a computer with the computer program instructions including program instructions configured to receive user input representative of a request to obtain an image from a remote computer. The computer program instructions of this embodiment also includes program instructions configured to determine a current context including a location of a mobile terminal and program instructions configured to cause the current context to be transmitted to the remote computer. The computer program instructions of this embodiment also include program instructions configured to receive an image from the remote computer based upon the current context of the mobile terminal. The image may be associated with the location of the mobile terminal upon receiving the user input. The computer program instructions of this embodiment also include program instructions configured to cause the image received from the remote computer to be stored.

The program instructions of an example embodiment may be configured to determine the current context by determining contextual information sensed by the mobile terminal. The contextual information of one embodiment may also include at least one of a time of day, a viewing angle, a weather environment, light conditions or a season. The computer program instructions of an example embodiment may also include program instructions configured to cause an image to be captured and program instructions configured to cause the image that was captured to be stored along with the image received from the remote computer. In this embodiment, the image that was captured may be provided to the remote computer.

The computer program instructions of an example embodiment may also include program instructions configured to assign a time value to the image received from the remote computer based upon a time at which the user input was received. In an example embodiment, the computer program instructions may also include program instructions configured to cause a user interface element to be displayed, program instructions configured to determine whether an image associated with the location of the mobile terminal is available from the remote computer and program instructions configured to cause a representation of the user interface element to be altered based upon availability of the image associated with the location of the mobile terminal from the remote computer. In this embodiment, the user interface element may be configured to receive the user input representative of the request to obtain an image from the remote computer.

In yet another embodiment, an apparatus is provided that includes means for receiving user input representative of a request to obtain an image from a remote computer. The apparatus of this embodiment also includes means for determining a current context including a location of a mobile terminal and means for causing the current context to be transmitted to the remote computer. The apparatus of this embodiment also includes means for receiving an image from the remote computer based upon the current context of the mobile terminal. The image may be associated with the location of the mobile terminal upon receiving the user input. The apparatus of this embodiment also includes means for causing the image received from the remote computer to be stored.

BRIEF DESCRIPTION OF THE DRAWINGS

Figure 1:
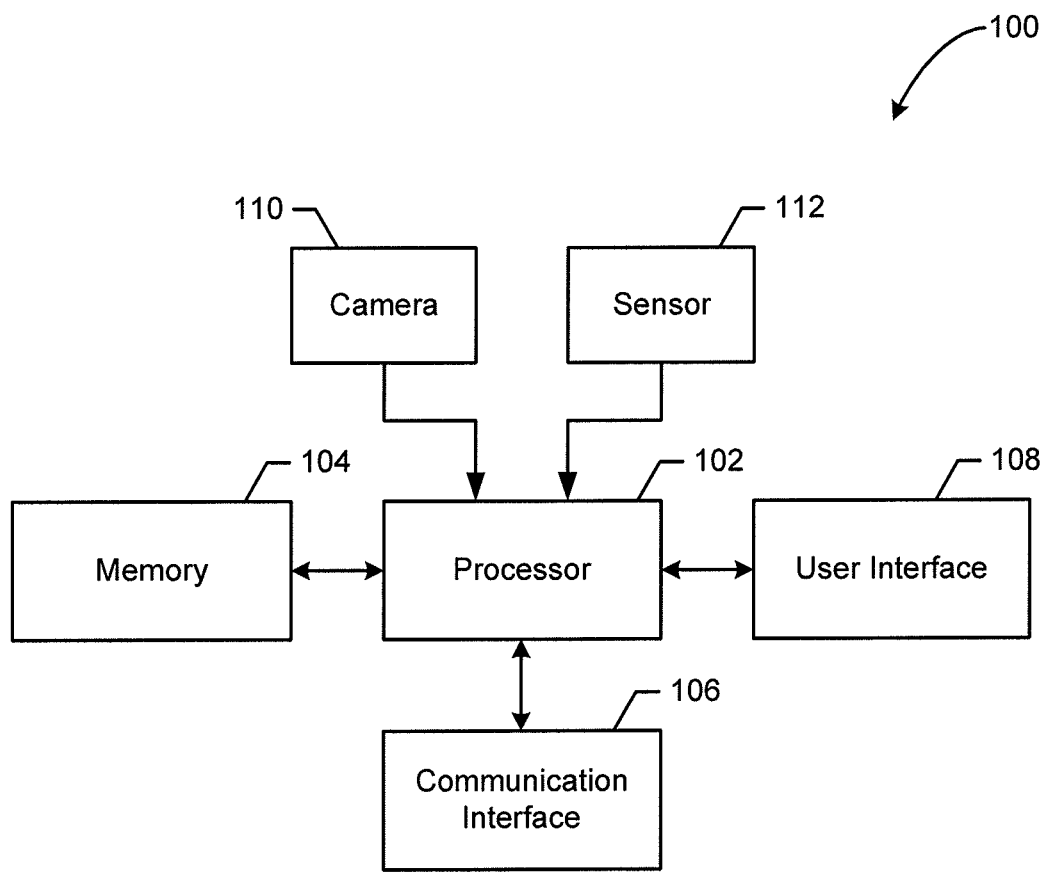
Figure 2:
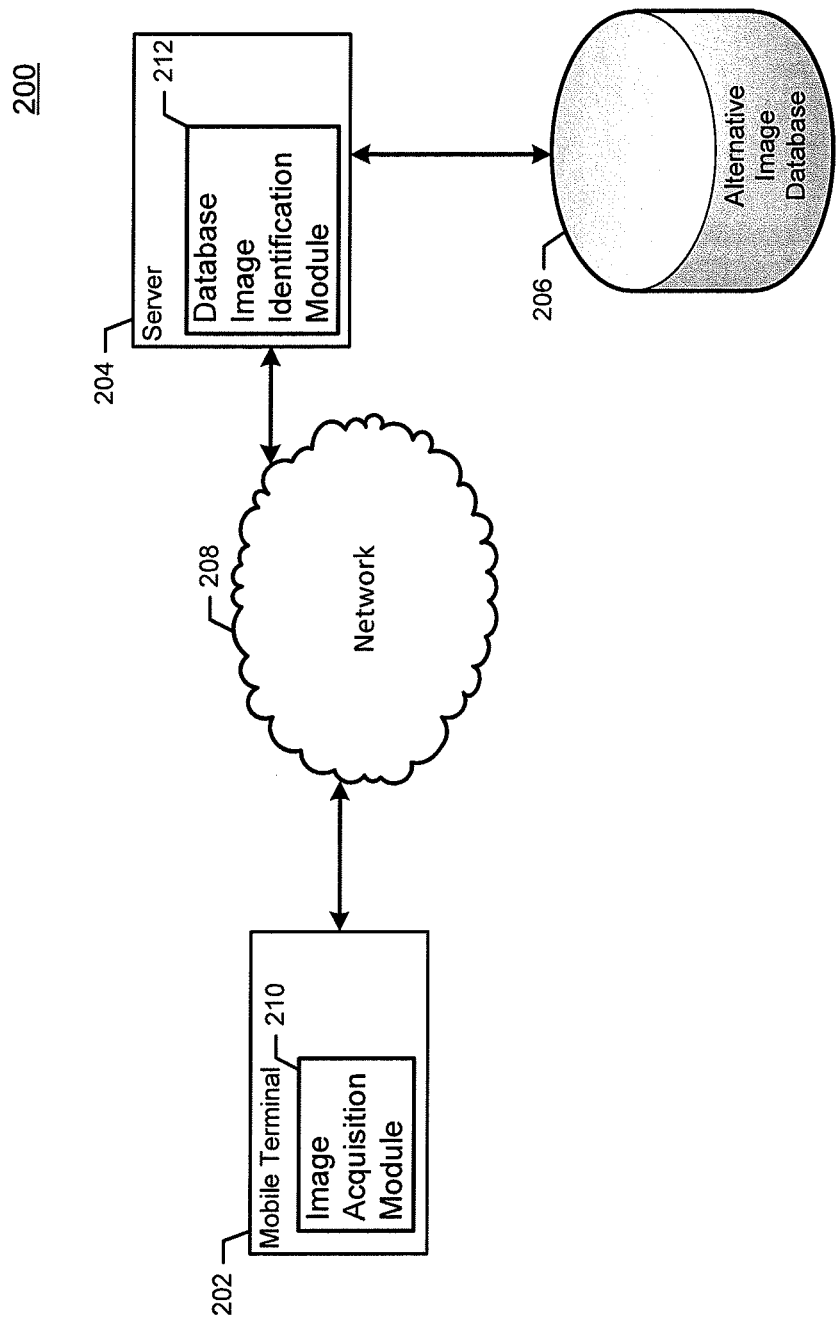
Figure 3:
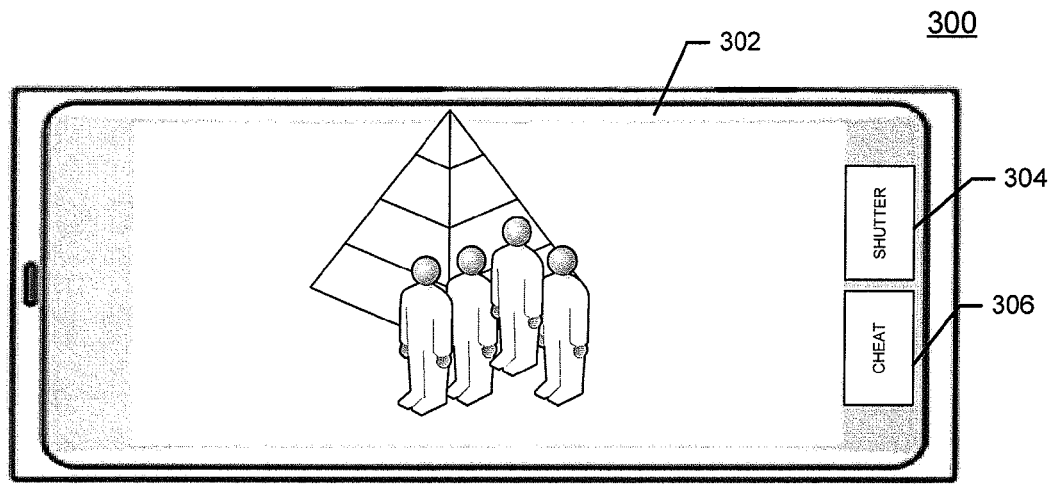
Figure 4:
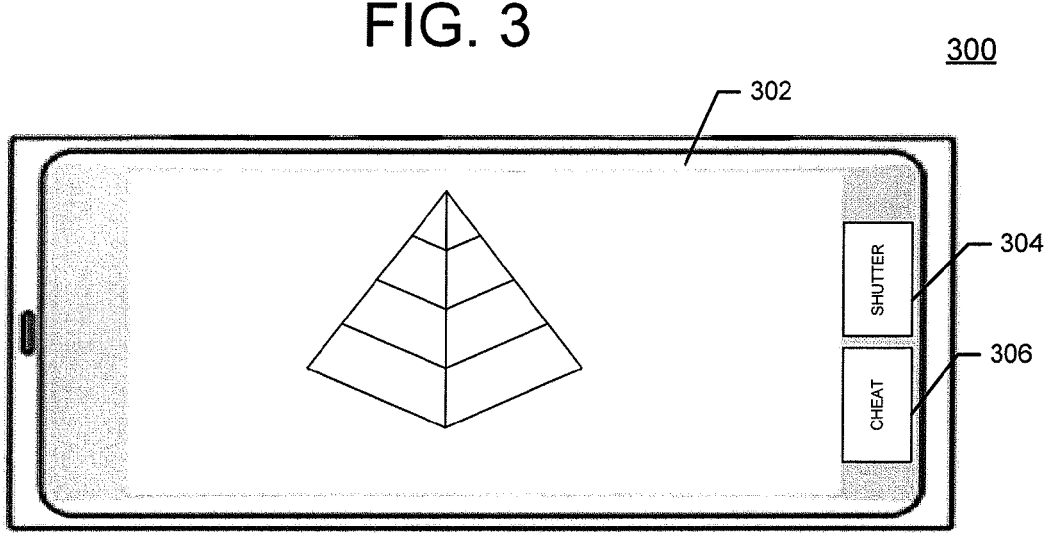
Figure 5:
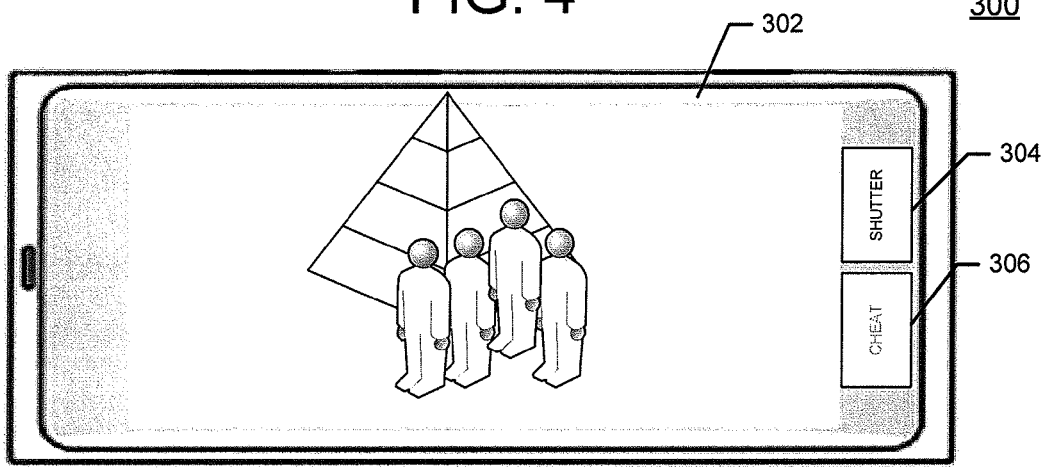
Figure 6:
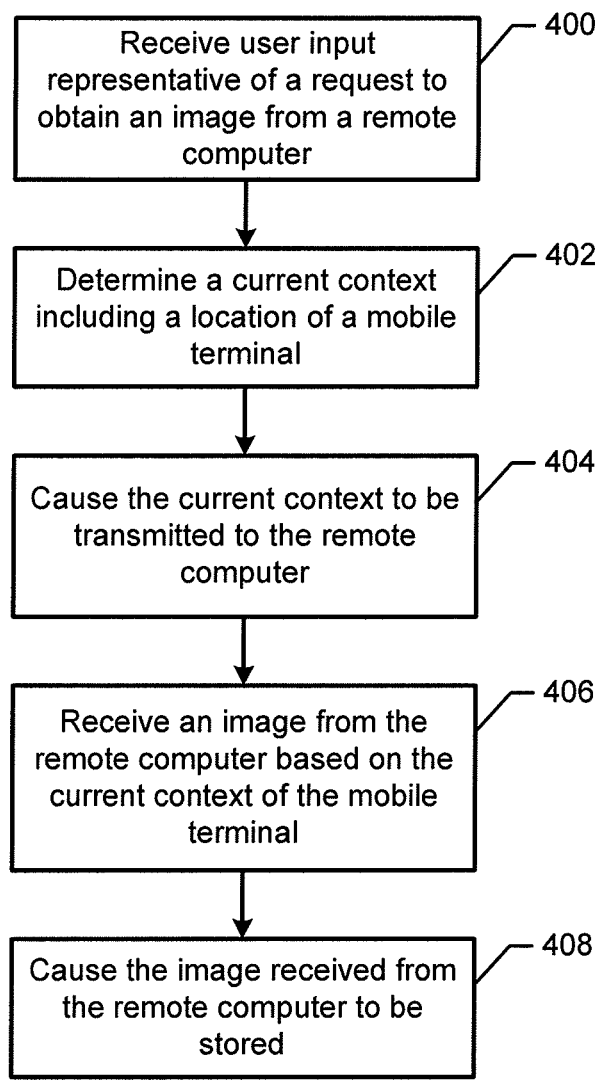

Having thus described certain embodiments of the invention in general terms, reference will now be made to the accompanying drawings, which are not necessarily drawn to scale, and wherein:

FIG. 1 is a block diagram of an apparatus that may be specifically configured in accordance with an example embodiment of the present invention;

FIG. 2 is a block diagram of a system for providing images in accordance with an example embodiment of the present invention;

FIG. 3 is an illustration of an interface of a mobile terminal for facilitating the provision of images from a remote computer in accordance with an example embodiment of the present invention;

FIG. 4 is an illustration of an interface of a mobile terminal depicting an image received from a remote computer in accordance with an example embodiment of the present invention;

FIG. 5 is an illustration of an interface of a mobile terminal in which the representation of the "cheat" control has been altered in accordance with an example embodiment of the present invention; and FIG. 6 is a flow diagram illustrating the operations performed in accordance with an example embodiment of the present invention.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (e.g., volatile or non-volatile memory device), can be differentiated from a "computer-readable transmission medium," which refers to an electromagnetic signal.

A method, apparatus and computer program product are provided in accordance with an example embodiment of the present invention in order to obtain an image from a remote computer based on the current context including the location of a mobile terminal. In this regard, a method, apparatus and computer program product of an example embodiment may determine the location of the mobile terminal and, in some embodiments, additional context information, such as a time of day, lighting conditions, weather conditions and/or the like, and may cause the current context to be transmitted to a remote computer, such as a server. The remote computer may provide the mobile terminal with an image based upon the current context of the mobile terminal with the image being associated with the location of the mobile terminal. As such, the method, apparatus and computer program product of an example embodiment may provide for the mobile terminal to receive an image from the remote computer that may be more aesthetically pleasing than could have been captured by the user, while also being representative of the image that could have been captured in accordance with the current context.

The system of an embodiment of the present invention may include an apparatus 100 as generally described below in conjunction with FIG. 1 for performing one or more of the operations set forth by FIG. 6 and also described below. In this regard, the apparatus 100 may be embodied by a mobile terminal. In this embodiment, the mobile terminal may be in communication with a display and/or a data network, either directly, such as via a wireless or wireline connection, or indirectly via one or more intermediate computing devices. In this regard, the display and the mobile terminal may be parts of the same system in some embodiments. However, the apparatus 100 may alternatively be embodied by another computing device that is in communication with the display and the mobile terminal, such as via a wireless connection, a wireline connection or the like. For example, the apparatus may be a mobile telephone, a personal digital assistant (PDA), a pager, a laptop computer, a tablet computer, a digital camera, or any of numerous other hand held or portable communication devices, computation devices, content generation devices, content consumption devices or combinations thereof. In some embodiments, the apparatus 100 may also or alternatively be embodied by a server or other remote computing node for providing a representative image based upon the current context of a mobile terminal.

It should also be noted that while FIG. 1 illustrates one example of a configuration of an apparatus 100 for obtaining an image from a remote computer that is based upon the current context of the mobile terminal, numerous other configurations may also be used to implement other embodiments of the present invention. As such, in some embodiments, although devices or elements are shown as being in communication with each other, hereinafter such devices or elements should be considered to be capable of being embodied within the same device or element and thus, devices or elements shown in communication should be understood to alternatively be portions of the same device or element.

Referring now to FIG. 1, the apparatus 100 for obtaining an image from a remote computer that is based upon the current context of the mobile terminal in accordance with one example embodiment may include or otherwise be in communication with one or more of a processor 102, a memory 104, a communication interface 106, a user interface 108, a camera 110 and a sensor 112. In some embodiments, the processor (and/or co-processors or any other processing circuitry assisting or otherwise associated with the processor) may be in communication with the memory device via a bus for passing information among components of the apparatus. The memory device may include, for example, a non-transitory memory, such as one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

In some embodiments, the apparatus 100 may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 102 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 102 may be configured to execute instructions stored in the memory device 104 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

Meanwhile, the communication interface 106 may be any means such as a device or circuitry embodied in either hardware or a combination of hardware and software that is configured to receive and/or transmit data from/to a network and/or any other device or module in communication with the apparatus 100, such as by supporting communications with a display and/or a mobile terminal. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

The apparatus 100 may include a user interface 108 that may, in turn, be in communication with the processor 102 to provide output to the user and, in some embodiments, to receive an indication of a user input. For example, the user interface may include a display and, in some embodiments, may also include a keyboard, a mouse, a joystick, a touch screen, touch areas, soft keys, a microphone, a speaker, or other input/output mechanisms. In one embodiment, the display of the apparatus may be embodied by a liquid crystal display (LCD) screen presented on one surface of the mobile terminal. For example, in an instance in which the display is an LCD screen embodied on one surface of the mobile terminal, the LCD display may be operable to function as a camera viewfinder. As described below, the user interface 108 may further allow for the user to provide input directing an image capture and/or input requesting that an image be obtained from a remote computer that is based upon the current context of the apparatus. The processor 102 may comprise user interface circuitry configured to control at least some functions of one or more user interface elements such as a display and, in some embodiments, a speaker, ringer, microphone and/or the like. The processor 102 and/or user interface circuitry comprising the processor 102 may be configured to control one or more functions of one or more user interface elements through computer program instructions (e.g., software and/or firmware) stored on a memory accessible to the processor (e.g., memory 104, and/or the like).

In some example embodiments, the apparatus 100 may include an image capturing element, such as a camera 110, video and/or audio module, in communication with the processor 102. The image capturing element may be any means for capturing an image, video and/or audio for storage, display or transmission. For example, in an example embodiment in which the image capturing element is a camera, the camera may include a digital camera capable of forming a digital image file from a captured image. As such, the camera may include all hardware (for example, a lens or other optical component(s), image sensor, image signal processor, and/or the like) and software necessary for creating a digital image file from a captured image. Alternatively, the camera may include only the hardware needed to view an image, while a memory device 104 of the apparatus stores instructions for execution by the processor in the form of software necessary to create a digital image file from a captured image. In an example embodiment, the camera 110 may further include a processing element such as a co-processor which assists the processor in processing image data and an encoder and/or decoder for compressing and/or decompressing image data. The encoder and/or decoder may encode and/or decode according to, for example, a joint photographic experts group (JPEG) standard, a moving picture experts group (MPEG) standard, or other format.

As shown in FIG. 1, the apparatus 100 may also include one or more sensors 112, such as a location information receiver (e.g., a GPS receiver), an accelerometer, a gyroscope, a compass, or the like, that may be in communication with the processor 102 and may be configured to determine the current context of the apparatus including the location of the apparatus and, in some instances the orientation of the apparatus.

FIG. 2 is a block diagram depicting an example of a system 200 for obtaining an image from a remote computer 204 based upon the current context of a mobile terminal 202 in accordance with an example embodiment of the present invention. The system 200 provides a mobile terminal 202 in communication with a remote computer, such as a server, 204 via a network 208. The mobile terminal 202 and the remote computer 204 may be computing devices and, as such, may embody the apparatus 100 as described with respect to FIG. 1. In the illustrated embodiment, the mobile terminal 202 may be operable to function as an image capture device, using an image capture module 210. The image capture module 210 may be implemented via hardware, software, or a combination thereof, such as the processor 102 described above, and the image capture module 210 may enable the mobile terminal 202 to capture an image, such as a photograph, by directing a processor to execute an image capture application. In other embodiments, however, the mobile terminal 202 is not configured to function as an image capture device. Regardless of whether the mobile terminal 202 is configured to function as an image capture device, the mobile terminal may be configured to interface with one or more sensors coupled to the mobile terminal to receive contextual information, such as the location of the mobile terminal, the orientation of the mobile terminal, the time of day, the weather environment, the lighting conditions or the like. In some embodiments, the mobile terminal 202 may be configured to receive the user's selection of particular contextual information that is different from the current context of the mobile terminal, thereby allowing user to override the current context. For example, the current weather may be rain, but the user may prefer to receive an image from the remote computer 204 depicting a scene in a sunny environment, or the current time of day may be daytime, but the user may prefer a nighttime view. The mobile terminal 202 may also be configured to receive an indication from the user indicating that certain characteristics are more important or less important than other characteristics, and, in one embodiment, may receive an indication from the user that certain characteristics (e.g., a user location) should not be transmitted to the remote computer 204.

Upon determining the current context, the mobile terminal 202 may transmit the current context, including the location of the mobile terminal, to the remote computer 204. The current context may be used in this manner to allow the remote computer 204 to identify an image that is representative of an image captured at the location and, in some embodiments, to identify an image that has the same or similar contextual information. Although the remote computer 204 receives contextual information representative of the current context from the mobile terminal 202, the remote computer of an example embodiment may also be configured to independently obtain additional contextual information, such as by obtaining weather information from a website based upon the location of the mobile terminal. The mobile terminal 202 may thereafter receive an image from the remote computer 204 that is based on the current context of the mobile terminal such that the image is associated with the location of the mobile terminal and, in some embodiments, has the same or similar contextual information. As such, the mobile terminal 202 may obtain an image that is consistent with its current context, even in an instance in which the mobile terminal does not capture the image itself, but, instead, obtains the image from a remote computer 204. In some instances, the image received from the remote computer 204 may be of better quality than could have reasonably been obtained by capturing an image with the mobile terminal 202.

The remote computer 204 may be configured to receive the current context including the location provided by the mobile terminal 202, and to match the current context received from the mobile terminal to the context information associated with images contained within an image database 206. The matching operation may be performed by the remote computer 204, such as an image identification module 212, configured to compare the current context received from the mobile terminal with contextual information of images stored in the image database 206. The image identification module 212 may be implemented as hardware, software, or a combination thereof, but, in one embodiment is embodied by a processor 102 as described above. Images stored in the image database 206 may be associated with a particular scene and may have particular contextual information. Images in the image database 206 may be identified as matching the current context if the contextual information of an image in the image database is substantially similar to the current context received from the mobile terminal 202, such as by being identical, being within a predefined range or being the closest from amongst the images in the image database. For example, an image in the image database 206 may be identified as being substantially similar if the image in the image database has a minimum number or percentage of contextual information that is identical to the current context received from the mobile terminal 202. Alternatively or additionally, an image in the image database 206 may be identified as having substantially similar characteristics if the contextual information is within a particular range of the current context received from the mobile terminal 202. For example, an image with a time characteristic of 11:00 AM may be identified as being substantially similar to a current context that is received from the mobile terminal 202 indicating a time of 10:55 AM. Various methods of weighting contextual information and establishing similarity thresholds may be employed to select the image in the image database 206. In some embodiments, an image in the image database 206 may be selected based on the selected image having the most similar contextual information to the current context received from the mobile terminal 202 (e.g., selecting a "closest" image from the image database).

The images stored by the image database 206 may be taken by professional photographers with professional equipment, in optimal lighting and viewing angle conditions, and/or the like. However, the images stored by the image database 206 may also or alternatively include images contributed by a number of other people including, for example, by the user of the mobile terminal 202. As noted above, the images stored within the image database 206 may be associated with contextual information of their own. For example, each image may be associated with contextual information indicating the location from which the image was taken, a direction and/or orientation at which the image was captured, a time of day and/or the date at which the image was captured or a description of the weather at the time at which the image was taken. The location may be defined in various manners including, for example, the latitude and longitude coordinates of the location, a street address, a name of a landmark within the image or the like. The image database 206 may be stored in local memory maintained by the remote computer 204, or it may be implemented on a separate computing device in communication with the remote computer. In some embodiments, the image database 206 is stored on a network, such as in a "cloud" environment.

The image database 206 may be configured to accept image submissions from users, such as from the user of the mobile terminal 202. Users that submit images in this manner may also be prompted to provide contextual information for association with provided images. Images submitted in this manner may be also rated by other users based on the quality of the image, how closely the contextual information matches the image, or by other rating criteria.

In some embodiments, a user of a mobile terminal 202 may capture an image at a location and may provide the image that was captured to the image database 206 along with a request for the remote computer 204 to provide an image from the image database based upon, e.g., matching, the image that was captured by the mobile terminal, such as by being taken at the same location. In this embodiment, the remote computer 204 may consider the contextual information associated with the image that was captured and may select one or more images from the image database 206 based upon the contextual information, such as by selecting one or more images from the image database that match the image that was captured by the mobile terminal 202. In identifying one or more images from the image database 206 based upon the contextual information, the remote computer 204 of an example embodiment may also consider the ratings associated with the images with more highly rated images being more likely to be provided by the remote computer than more lowly rated images in an instance in which all other contextual information is the same. The contextual information associated with the image that was captured by the mobile terminal 202 may be provided by the mobile terminal and/or may be determined by the remote computer 204 by an analysis of the image.

The image identification module 212 may weight certain contextual information in its analysis of the images in the image database 206 relative to the contextual information provided by the mobile terminal 202. For example, the remote computer 204 may be configured to place a higher priority on matching a location and viewing angle of an image than a time of day or weather of an image. The relative priorities to be associated with the contextual information may be provided by the mobile terminal 202 in one example embodiment.

After determining one or more images based upon the current context of the mobile terminal 202, the remote computer 204 may provide the images to the mobile terminal 202. The images may be directly transmitted to the mobile terminal 202, or the remote computer 204 may provide links or another way of accessing the images. In some embodiments, the remote computer 204 may only provide access to images from the image database 206 in an instance in which the current context of the mobile terminal 202 and the contextual information associated with the image from the image database satisfy a similarity threshold. In this manner, the remote computer 204 may function to "keep the user honest" to verify that, although the image from the image database 206 may not be from the exact same location as the location identified by the current context of the mobile terminal 202, the user has in fact visited the site, event, or the like. As such, users may use images provided by the image database 206 in this manner as evidence to others that they visited a particular landmark or event.

FIG. 3 is a schematic diagram of an interface 300 that may be provided by a mobile terminal 202 of one embodiment. Although not required, the mobile terminal 202 of one embodiment may function as an image capture device that allows the user to capture an image with the mobile terminal. However, the mobile terminal 202 may also or alternatively be configured to obtain an image from a remote computer 204 based upon the current context of the mobile terminal.

In the illustrated embodiment, the interface 300 includes a viewfinder 302. The viewfinder 302 may function to display an image that includes at least a portion of the current field of view of the mobile terminal 202. In some embodiments, the mobile terminal 202 may include a camera 110 configured to capture the image displayed by the viewfinder 302, such as in response to actuation of a shutter control 304.

The interface 300 of the illustrated embodiment may further include a user interface element identified as a "cheat" control 306. Actuation of the cheat control 306 may cause the current context of the mobile terminal 202 including the location of the mobile terminal to be captured. Actuation of the cheat control 306 may also cause the current context of the mobile terminal 202 to be provided to the remote computer 204 such that an image that is based upon the current context of the mobile terminal, such as by being associated with the location of the mobile terminal, may be provided by the remote computer to the mobile terminal. As such, the cheat control 306 may provide the user with a method of obtaining an image from the remote computer 204 that may have the same or similar contextual information (e.g., the same location, viewing angle, and/or time of day) relative to the current context of the mobile terminal 202. In some instances, the image provided by the remote computer 204 may be of a higher quality and/or more aesthetically pleasing than if the user had captured an image with the mobile terminal 202 since the image provided by the remote computer may, in some instances, have been captured with better photographic equipment and/or by someone with superior photographic knowledge and experience.

In the instant example, the viewfinder 302 displays a scene of a pyramid that experiences a high volume of tourist traffic. The image viewable by the viewfinder 302 includes numerous tourists that obscure the view of the pyramid. In order to obtain a photograph that is not obscured by tourists, the user of the mobile terminal 202 may need to wait for a long period of time to line up a shot that is not obscured by the crowds. The user may also be forced to compromise on viewing angle or focal length based on other factors, such as the crowds and areas of the grounds from which the user is permitted to capture an image. If the user were a professional photographer with a permit from the local government and professional equipment, they might be able to take a higher quality photograph from a better location or at a time when the grounds are not overrun with tourists.

FIG. 4 is a schematic diagram of an interface 300 of a mobile terminal 202 that is configured to display an image based upon the current context of the mobile terminal and associated with the location of the mobile terminal that has been provided by a remote computer 204 in accordance with an example embodiment of the present invention. The interface 300 reflects an example display that may be provided to a user if the user were to actuate the cheat control 306 described with respect to FIG. 3. The image provided by the remote computer 204 and presented by the viewfinder 302 includes the same pyramid as shown with respect to FIG. 3, and may be associated with contextual information that is the same or similar to the current context of the mobile terminal 202, such as by being captured from a similar viewing angle and at a similar time of day and weather environment, but without the crowds of tourists. As such, the pyramid may be more clearly seen in the image provided by the remote computer 204.

In one embodiment, the appearance of the user interface element, e.g., the cheat control 306 or another user interface element, that is actuated to request an image from the remote computer 204 may be altered depending upon the availability of an image from the remote computer that is associated with the current location of the mobile terminal 202. In this regard, the apparatus 100, such as the processor 102, the user interface 108 or the like, embodied by the mobile terminal 202 may cause the user interface element, e.g., the cheat control 306 or another user interface element, that is actuated to request an image from the remote computer 204 to be displayed. The apparatus 100, such as the processor 102, of this embodiment may also be configured to determine whether an image associated with the location of the mobile terminal 202 is available from the remote computer 204. For example, the apparatus 100 may cause the remote computer 204 to be provided with the current location of the mobile terminal 202 and the remote computer may, in turn, provide an indication as to the availability, or not, of an image that is associated with the current location of the mobile terminal. The apparatus 100, such as the processor 102, the user interface 108 or the like, may then cause a representation of the user interface element to be altered based upon the availability from the remote computer 204 of the image associated with the location of the mobile terminal 202. In an instance in which an image is available from the remote computer 204, the user interface element, e.g., the cheat control 306 or another user interface element, may be presented in a manner that is consistent to that in which the other controls are presented as shown in FIGS. 3 and 4. However, in an instance in which an image associated with the location of the mobile terminal 202 is unavailable from the remote computer 204, the apparatus 100, such as the processor 102, the user interface 108 or the like, may cause the representation of the user interface element to be altered, such as by causing the user interface element to be faded as shown in FIG. 5 or by otherwise indicating the unavailability of the function. As such, a user may quickly and intuitively determine if an image associated with the location of the mobile terminal 202 is available from the remote computer 204 by considering the manner in which the corresponding user interface element is presented.

FIG. 6 is a flow diagram illustrating the operations performed by an apparatus 100 embodied by a mobile terminal 202 in accordance with an example embodiment of the present invention. Referring now to block 400 of FIG. 6, the apparatus 100 may include means, such as the processor 102, the user interface 108 or the like, for receiving user input representative of a request to obtain an image from a remote computer 204. As described above, the user input may be provided in the form of an actuation of a user interface element, such as a cheat control 306. However, the user input representative of a request to obtain an image from a remote computer 204 may be obtained in other manners in other embodiments. As shown in block 402, the apparatus 100 may also include means, such as the processor 102, the sensors 112 or the like, for determining the current context, including the current location, of the mobile terminal 202. In one embodiment, for example, the current context may be determined by sensing contextual information with the mobile terminal. Although the current context may simply include the current location of the mobile terminal 202, the current context may, in other embodiments, also include other contextual information, including the time of day, the viewing angle, the weather environment, the light conditions, the season or the like, which may be sensed by the mobile terminal.

Referring now to block 404 of FIG. 6, the apparatus 100 may also include means, such as the processor 102, the communications interface 106 or the like, for causing the current context to be transmitted to the remote computer 204, such as in conjunction with the request for an image that is based upon the current context of the mobile terminal 202. The apparatus 100 may also include means, such as the processor 102, the communications interface 106 or the like, for receiving an image from the remote computer 204 based upon the current context of the mobile terminal 202. See block 406 of FIG. 6. In this regard, the image that is received from the remote computer 204 is associated with the location of the mobile device 202 at the time at which the user input was received. As described above, the image provided by the remote computer 204 and received by the mobile terminal 202 may be associated with contextual information that is matches, e.g., is the same or similar to, the current context of the mobile terminal. As shown in FIG. 4, the apparatus 100, such as the processor 102, the user interface 108 or the like, may cause the image that is received from the remote computer to be displayed. Additionally or alternatively, the apparatus 100 may include means, such as the processor 102, the memory 104 or the like, for causing the image received from the remote computer 204 to be stored. See block 408 of FIG. 6. In one embodiment, the apparatus 100 may include means, such as the processor 102, for assigning a time value to the image received from the remote computer 204. The time value may be based upon the time at which the user input was received that served to request that an image be obtained from the remote computer 204. As such, the image provided by the remote computer 204 may be time-stamped and stored in the same fashion as other images captured by the mobile terminal 202.

In one embodiment, the user may modify at least some of the contextual information prior to provision of the current context to the remote computer 204. In this regard, the apparatus 100 may include the means, such as the processor 102, user interface 108 or the like, for receiving user input partially overriding the some of the contextual information that defines the current context of the mobile terminal 202. As such, the image that is thereafter received from the remote computer 204 based upon the current context may, in this embodiment, be based upon the current context as partially overridden by the user. By way of an example, the current weather may be rainy, but the user of the mobile terminal 202 may desire an image to be retrieved from the remote computer 204 that was taken on a sunny day such that the user may override the weather conditions included within the current context so as to better represent the desires of the user.

Although the mobile terminal 202 need not be configured to capture images itself, the mobile terminal of one embodiment may be configured to capture images. Thus, the apparatus 100 of this embodiment may include means, such as the processor 102, the camera 110 or the like, for causing an image to be captured. In this embodiment, the apparatus 100 may also include means, such as a processor 102, the memory 104 or the like, for causing the image that was captured to be stored along with the images received from the remote computer 204. Thus, images captured by the mobile terminal 202 and images received from the remote computer 204 may be time-stamped and stored in the same fashion in accordance with one embodiment, thereby facilitating subsequent review of the images without delineation as to whether the images were directly captured by the mobile terminal or provided by a remote computer.

In one embodiment in which the mobile terminal 202 is configured to capture images, the apparatus 100 may include means, such as the processor 102, the communication interface 106 or the like, for causing the image that was captured to be provided to the remote computer 204. In this regard, the image that was captured may be provided to the remote computer 204 and the contextual information that is associated with or that may be derived from the image, such as a result of image analysis performed by the remote computer, may either serve as the current context of the mobile terminal 202 that is provided to the remote computer or may supplement the current context of the mobile terminal by also being provided to the remote computer. In this embodiment, the image that is provided to the mobile terminal 202 from the remote computer 204 based upon the current context of the mobile terminal including the location of the mobile terminal may be based, at least in part, upon the contextual information associated with or derived from the image that was captured by the mobile terminal and provided to the remote computer. The mobile terminal 202 may also be configured to provide some or all of the images that are captured by the mobile terminal to the remote computer 204 in order to supplement the image database 206 of the remote computer.

As described above, the method, apparatus 100 and computer program product of an example embodiment allow a mobile terminal 202 to obtain images from a remote computer 204 that are based upon the current context of the mobile terminal. Thus, in some embodiments, the method, apparatus 100 and computer program product may obtain images that are of higher quality or otherwise more aesthetically pleasing than could be readily captured by the mobile terminal 202. Moreover, the method, apparatus 100 and computer program product of one embodiment is responsive to user input so as to obtain an image from the remote computer 204 that is based upon the current context of the mobile terminal 202, such as by being associated with the location of the mobile terminal, in an automated manner so as not to distract the user or otherwise consume the user's time.

It will be understood that each block of the flowchart, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory 104 of an apparatus employing an embodiment of the present invention and executed by a processor 102 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
   determining whether an image associated with a location of a mobile terminal is available from a remote computer;
   causing a representation of a user interface element to be altered based upon availability of the image associated with the location of the mobile terminal from the remote computer;
   receiving user input representative of a request to obtain an image from the remote computer, wherein the user input is received via the user interface element;
   determining, using a processor, a current context including the location of the mobile terminal;
   causing the current context to be transmitted to the remote computer;
   receiving an image from the remote computer based upon the current context of the mobile terminal, wherein the image is associated with the location of the mobile terminal upon receiving the user input; and
   causing the image received from the remote computer to be stored,
   wherein the current context is determined and the image is received from the remote computer without capture of an image by the mobile terminal.

2. The method of claim 1, wherein determining the current context comprises determining contextual information sensed by the mobile terminal.

3. The method of claim 2, wherein the contextual information further includes at least one of a time of day, a viewing angle, a weather environment, light conditions or a season.

4. The method of claim 1, further comprising causing an image to be captured and causing the image that was captured to be stored along with the image received from the remote computer.

5. The method of claim 4 further comprising causing the image that was captured to be provided to the remote computer.

6. The method of claim 1, further comprising assigning a time value to the image received from the remote computer based upon a time at which the user input was received.

7. The method of claim 1, further comprising receiving user input partially overriding the current context, wherein receiving an image from the remote computer based upon the current context comprises receiving the image from the remote computer based upon the current context as partially overridden by the user input.

8. An apparatus comprising at least one processor and at least one memory including computer program instructions, the at least one memory and the computer program instructions configured to, with the at least one processor, cause the apparatus at least to:
   determine whether an image associated with a location of a mobile terminal is available from a remote computer;
   cause a representation of a user interface element to be altered based upon availability of the image associated with the location of the mobile terminal from the remote computer;
   receive user input representative of a request to obtain an image from the remote computer, wherein the user input is received via the user interface element;
   determine a current context including the location of the mobile terminal;
   cause the current context to be transmitted to the remote computer;
   receive an image from the remote computer based upon the current context of the mobile terminal, wherein the image is associated with the location of the mobile terminal upon receiving the user input; and
   cause the image received from the remote computer to be stored,
   wherein the current context is determined and the image is received from the remote computer without capture of an image by the mobile terminal.

9. The apparatus of claim 8, wherein the at least one memory and the computer program instructions are configured to, with the at least one processor, cause the apparatus to determine the current context by determining contextual information sensed by the mobile terminal.

10. The apparatus of claim 9, wherein the contextual information further includes at least one of a time of day, a viewing angle, a weather environment, light conditions or a season.

11. The apparatus of claim 8, wherein the at least one memory and the computer program instructions are further configured to, with the at least one processor, cause the apparatus to cause an image to be captured and to cause the image that was captured to be stored along with the image received from the remote computer.

12. The apparatus of claim 11, wherein the at least one memory and the computer program instructions are further configured to, with the at least one processor, cause the apparatus to cause the image that was captured to be provided to the remote computer.

13. The apparatus of claim 8, wherein the at least one memory and the computer program instructions are further configured to, with the at least one processor, cause the apparatus to assign a time value to the image received from the remote computer based upon a time at which the user input was received.

14. The apparatus of claim 8, wherein the at least one memory and the computer program instructions are further configured to, with the at least one processor, cause the apparatus to receive user input partially overriding the current context, wherein the at least one memory and the computer program instructions are configured to, with the at least one processor, cause the apparatus to receive an image from the remote computer based upon the current context by receiving the image from the remote computer based upon the current context as partially overridden by the user input.

15. A computer program product comprising at least one non-transitory computer-readable storage medium bearing computer program instructions embodied therein for use with a computer, the computer program instructions comprising program instructions configured to:
  determine whether an image associated with a location of a mobile terminal is available from a remote computer;
  cause a representation of a user interface element to be altered based upon availability of the image associated with the location of the mobile terminal from the remote computer;
  receive user input representative of a request to obtain an image from the remote computer, wherein the user input is received via the user interface element;
  determine a current context including the location of the mobile terminal;
  cause the current context to be transmitted to the remote computer;
  receive an image from the remote computer based upon the current context of the mobile terminal, wherein the image is associated with the location of the mobile terminal upon receiving the user input; and
  cause the image received from the remote computer to be stored,
  wherein the current context is determined and the image is received from the remote computer without capture of an image by the mobile terminal.

16. The computer program product of claim 15, wherein the program instructions configured to determine the current context comprise program instructions configured to determine contextual information sensed by the mobile terminal.

17. The computer program product of claim 16, wherein the contextual information further includes at least one of a time of day, a viewing angle, a weather environment, light conditions or a season.

18. The computer program product of claim 15, wherein the program instructions are further configured to cause the apparatus to cause an image to be captured and to cause the image that was captured to be stored along with the image received from the remote computer.

19. The computer program product of claim 15, wherein the program instructions are further configured to cause the image that was captured to be provided to the remote computer.

20. The computer program product of claim 15, wherein the program instructions are further configured to assign a time value to the image received from the remote computer based upon a time at which the user input was received.

21. The computer program product of claim 15, wherein the computer program instructions further comprise program instructions configured to receive user input partially overriding the current context, and wherein the program instructions configured to receive an image from the remote computer based upon the current context comprise program instructions configured to receive the image from the remote computer based upon the current context as partially overridden by the user input.

* * * * *